Oct. 16, 1934.  F. E. STAHL  1,976,900
EMERGENCY ANTISKID DEVICE
Filed Dec. 23, 1932   2 Sheets-Sheet 1
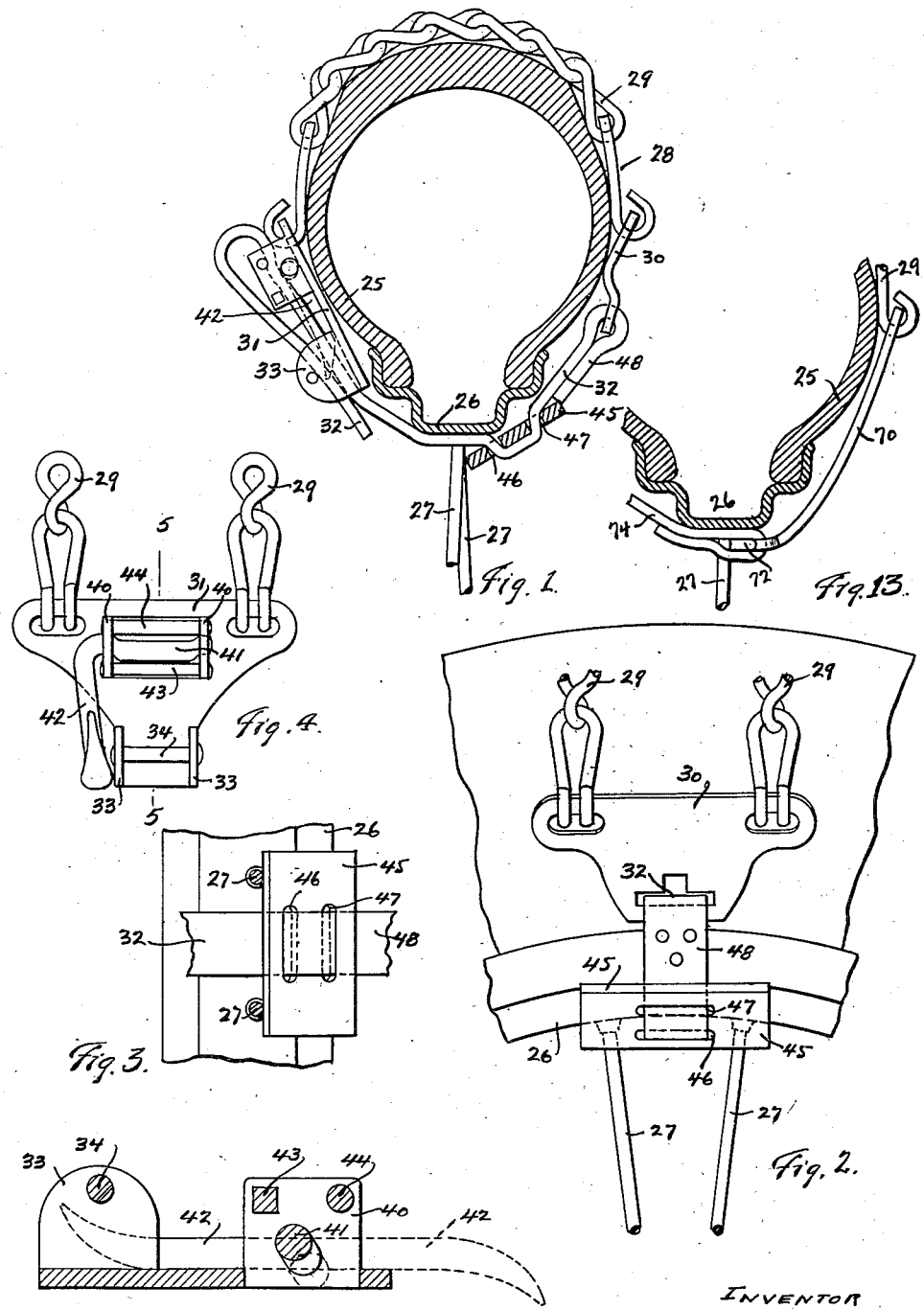

Oct. 16, 1934.  F. E. STAHL  1,976,900
EMERGENCY ANTISKID DEVICE
Filed Dec. 23, 1932  2 Sheets-Sheet 2

INVENTOR
FRANK E. STAHL
By J. W. Ellis
ATTORNEY

Patented Oct. 16, 1934

1,976,900

UNITED STATES PATENT OFFICE 1,976,900

EMERGENCY ANTISKID DEVICE

Frank E. Stahl, Tonawanda, N. Y.

Application December 23, 1932, Serial No. 648,599

3 Claims. (Cl. 152—14)

My invention relates in general to anti-skid devices, and in particular to a stop for anti-skid chains of the emergency type, or that type which is placed laterally around the tire and rim or felloe of the wheel, where each is individually fastened by suitable clamping means.

It is well known to those skilled in the art that when emergency anti-skid tire chains are used upon tires of automobiles, there is a tendency for the chains to creep laterally around the tire or in a plane parallel to the axis of the wheel carrying the tire. This is particularly true when the car equipped with such chains is making a turn. Under such conditions the centrifugal action upon the car will tend to move the tire across the emergency chain when such chain is in contact with the pavement, thus causing the chain to creep with the result that the fastening means thereof may be moved up to and partly around the tread of the tire where abnormal wear occurs. Creeping may also occur while driving over a straight course since the fastening means of such emergency chains are usually relatively heavy and are located on one side of the tire, thus placing the chain out of balance. Under such conditions centrifugal action caused by the rotation of the tire tends to move the fastenings means to the highest point on the tire, with the result that the fastening means and strap of the device are brought up around over the tread of the tire which of course results in rapid wear and breakage of the device.

The principal object of my invention has been to provide a stop for emergency chains which shall engage some part of the wheel and thus prevent creeping or lateral movement of the chains around the tire.

Another object has been to provide stop means for emergency chains by means of which the life of the chain will be increased and frequent repairs or renewals made unnecessary.

Moreover, it has been an object to provide means for emergency chains which will be so simple and inexpensive that the cost of the chains equipped with my invention will not be appreciably increased.

The above objects and advantages have been accomplished by the device shown in the accompanying drawings, of which:

Fig. 1 is a transverse section of a tire and rim, showing an emergency chain applied thereto with one form of my device in position.

Fig. 2 is a fragmentary, side elevation of the form of invention shown in Fig. 1.

Fig. 3 is a bottom plan view of the form of invention shown in Fig. 1.

Fig. 4 is a side view of the locking plate with its clamping means.

Fig. 5 is an enlarged, sectional view of the locking plate, and is taken on line 5—5 of Fig. 4.

Figs. 8, 9, 10, 11, and 12 are similar views of various modifications of my invention.

Fig. 13 is a fragmentary, sectional elevation of a modified form of device.

Figure 14:
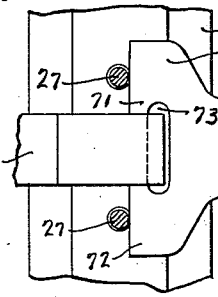
Figure 12:
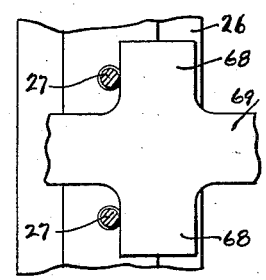

Fig. 14 is a fragmentary bottom plan view of the same.

Figure 15:
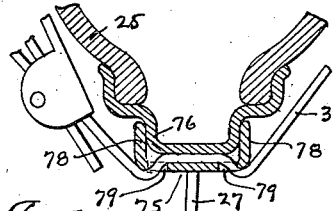

Fig. 15 is a view similar to Fig. 13 of another modification.

Figure 16:
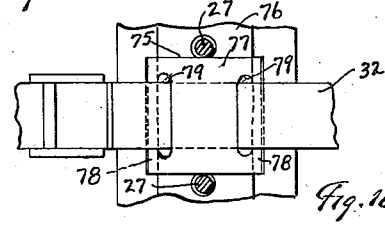

Fig. 16 is a fragmentary bottom plan view of the form of Fig. 15.

Figure 17:
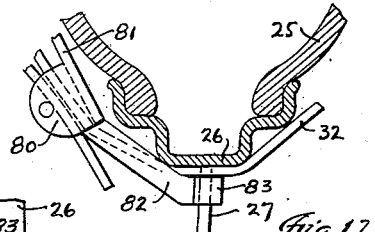

Fig. 17 is a fragmentary, transverse section, and shows a further modification of the device.

Figure 18:
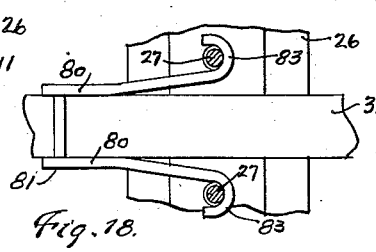

Fig. 18 is a bottom plan view of the form of invention shown in Fig. 17.

Figure 19:
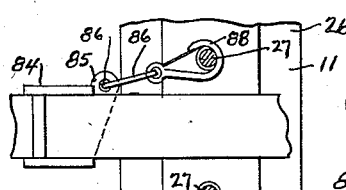

Fig. 19 is another bottom plan view and shows another form of my invention.

Referring to the form of invention shown in Figs. 1-5 inclusive, 25 represents the tire and 26 the rim thereof. While I have shown a rim and tire of the clincher type and a wheel of the wire spoke type, it is obvious that the invention is applicable to the demountable rim with the artillery type wheel. The wire spokes 27 of the wheel are carried by the rim 26. An emergency anti-skid chain 28 is shown attached to the tire and rim and comprises preferably two cross chains 29 secured at one of their ends to a strap plate 30 and at their other ends to a lock plate 31. The strap 32 is permanently secured to the strap plate 30 and is passed through the lock plate 31 which, together with its associated parts, comprises the clamping means of the anti-skid device. The lock plate is provided with guiding ears 33, one arranged at each side of the entrance end of the plate, and a pin 34 is carried by the ears under which the free end of the strap is passed after it has been fastened in position. The clamping means of this chain may be any of the well known types, but I have shown in the drawings a preferred form. In this form, the plate is provided with two interspaced ears 40 between which is pivotally mounted a clamping cam 41. This cam has an operating arm 42 by which it is manipulated. Arranged above the cam 41 is a square bar 43 and a round bar 44.

These bars are interspaced and the strap is forced by the cam up against the bars, where it is firmly gripped. The free end is then returned and passed again between the ears 33 and under the pin 34, as above described. In Fig. 5 the arm 42 is shown in dotted lines in the position which it will occupy when the strap is threaded through the plate. In this position the cam 41 will be lowered. When the operating arm is now rotated in a counter-clockwise direction, the cam is brought up to the full line position where it will clamp the strap as above described.

The stop 45 of my invention, shown in these figures, is made in the form of a flat plate which may be of rigid or flexible material, such as fiber or laminated rubber. The stop is provided with two interspaced slots 46 and 47, and the strap 32 is threaded through these slots, as shown in the drawings.

When the device shown in Figs. 1 to 3 is to be used, the stop is located on the strap so that it will come on the side of the device opposite to the clamping means thereof and in such position that, when the cross chains 24 are in their working positions, it will engage the spokes 27. The frictional engagement of the strap with the stop may be relied upon to hold the stop in position, but further security against slippage may be had by making the return end 48 of the strap of such a length that it will contact with the adjacent edge of the stop and thus act to prevent its further movement along the strap.

Figure 7:
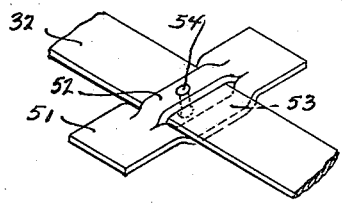
Fig. 7 is a perspective view of another modification.
Figure 6:
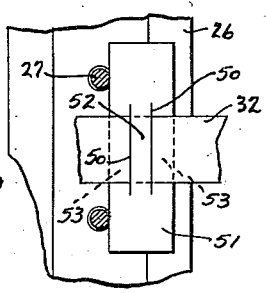
Fig. 6 is a fragmentary, bottom plan view of a modified form of stop.

The form of invention shown by the bottom plan view in Fig. 6 is similar to that of the other figures just described, except that it is preferably made of flexible material which is provided with two interspaced slits 50 running longitudinally of the stop 51. When the strap is inserted in this stop, the portion 52 lying between the slits 50 will be pressed upwardly and the portions 53 lying between the slits and the longitudinal edges of the stop will be pressed downwardly, as clearly shown by the form of invention of Fig. 7. In Fig. 7 the strap 51 of Fig. 6 is shown. Instead of depending upon friction to hold the stop of Fig. 6 in position, or instead of holding it in place by means of the return end 48 of the strap, as shown, for instance, in Fig. 1, in Fig. 7 I show the use of a rivet 54 which is passed preferably through the portion 52 of the stop and through the strap, whereby the stop is prevented from sliding upon the strap.

Figure 8:
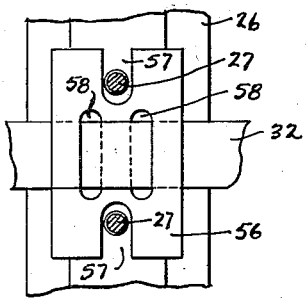
Figure 9:
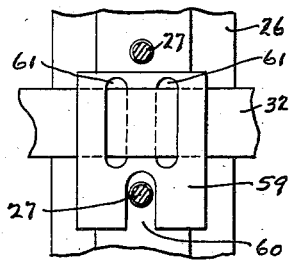

It may in some cases be desired to hold the stop against movement in either direction, and to accomplish this I have shown two forms of device in Figs. 8 and 9. In Fig. 8 the stop 56 is provided with oppositely arranged slots 57 formed in the lateral edges of the plate. The plate is of such a length that, when in position, the slots 57 will be engaged with the spokes 27 of the wheel. Interspaced, longitudinal slots 58 are also provided in this stop for the passage of the belt. In Fig. 9 the stop 59 is shorter than the stop 56, and only one slot 60 is formed in one of the lateral edges of the stop. The other lateral edge of the stop does not extend to or engage with the opposite spoke 27 of the wheel. Suitable strap slots 61 are also provided in this form.

Figure 10:
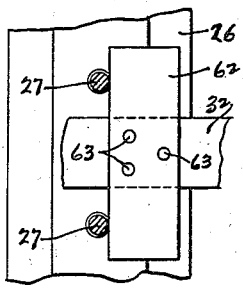

In Fig. 10 I have shown a stop 62 which is made of a piece of flat material which is secured in its proper position to the outside face of the strap by a number of rivets 63, passed through the stop and the strap.

Figure 11:
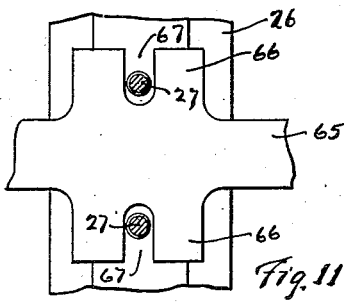

In Fig. 11 I have shown a form of invention where the strap 65 is provided at a suitable point in its length with stop tabs 66. These tabs extend from opposite sides of the strap body and each is provided in its end with a slot 67 for engagement with the spokes 27 of the wheel. Instead of forming the tabs 66 with slots 67, tabs 68 may be formed, as shown in the modified form of Fig. 12. These tabs are extended far enough from the body 69 of the strap to engage the spokes 27 of the wheel.

In some cases, it may be advisable or desirable to use a shorter strap and to extend the side plate of the chain. Such a modification is shown in Figs. 13 and 14 where the side plate 70 extends from the ends of the cross chains down the side of the tire and rim, having its lower end 71 bent outwardly as shown. This end of the plate is formed with stop tabs 72. These tabs extend far enough to engage the spokes 27 of the wheel. The end 71 of this plate is formed with a slot 73 for the passage of the end of the strap 74.

In Figs. 15 and 16 I have shown a form of invention where, instead of having the stop engaged with the spokes of the wheel, a stop 75 is provided which engages with the felloe 76 of the wheel. The stop 75 is provided with a body part 77 which extends across the inner surface of the felloe of the wheel and which is provided with two upwardly extending flanges 78 which engage the side walls of the felloe and thus keep the stop from shifting laterally. The body 77 of the stop is provided with slots 79 through which the strap 32 is passed. The strap is threaded through the slots, as shown in these figures, and is held therein frictionally. If desired, however, a rivet (not shown) may be passed through it to aid in holding it in place.

In the form of invention shown in Figs. 17 and 18 a device is shown which clamps onto the spokes instead of abutting against them as in many of the other forms. In this form the ears 80 of the locking plate 81 are each formed with a downwardly and inwardly extending arm 82. These arms are flared outwardly slightly away from each other, and each is provided at its extreme end with an open hook 83. These hooks are so positioned that when the device is in place, they will engage the spokes 27 and thus directly act upon the locking plate with its fastening means to hold it against lateral rotative movement about the tire.

In Fig. 19 I show still another modified form of device. In this form the locking plate 84 is provided at its extreme lower end with an outwardly extending tab 85. A rod, flexible wire, or chain 86 is secured to the tab by passage through the opening 87 thereof, and this rod or wire has at its extreme outer end a snap hook 88 which when in use is snapped over a spoke 27.

From the foregoing, it will be obvious that when my device in any of the forms shown in the accompanying drawings is applied to or made a part of an emergency tire chain, the tire chain will be held substantially in its initially adjusted position, and the fastening means will be prevented from creeping around to a point where it will come in contact with the pavement. My invention, therefore, keeps the cross chains of emergency anti-skid devices on the tread of the tire where they belong. The life of the emergency chain is thereby greatly increased by preventing the excessive wear and consequent breakage of parts of the chain when the fastening means is permitted to creep around to the tread of the tire.

While I have shown numerous forms of devices for carrying out my invention, it is obvious that some changes or combinations of these devices may be used or that still other forms might be developed. My invention is of such a scope that any means may be employed which is secured to the strap or any other part of the emergency chain and which engages either by abutment or by tension with any part of the wheel or spoke or rim thereof.

Having thus described my invention, what I claim is:

1. In an emergency anti-skid device, the combination with cross chains, of a flexible fabric strap element, and a stop carried by the strap element, said stop being engageable with two adjacent spokes of the wheel carrying the device and having a length greater than the distance between said spokes, said strap element having a width less than the distance between said spokes, whereby the device will be prevented from creeping laterally around the tire.

2. In an emergency anti-skid device, the combination with cross chains, of a flexible fabric strap element, and a stop secured to the strap element, said stop abutting against two spokes of the wheel carrying the device and having a length greater than the distance between said spokes, said strap element having a width less than the distance between said spokes, whereby the device will be prevented from creeping laterally around the tire.

3. An emergency anti-skid device having, in combination, a cross chain, an adjustable flexible fabric strap element connecting the chain, and a stop secured to the strap element, said stop abutting against two spokes of the wheel carrying the chain and having a length greater than the distance between said spokes, said strap element having a width less than the distance between said spokes, whereby the chain will be prevented from creeping laterally around the tire.

FRANK E. STAHL.